US006292051B1

(12) United States Patent
Su et al.

(10) Patent No.: US 6,292,051 B1
(45) Date of Patent: Sep. 18, 2001

(54) ARCHITECTURE OF NON-SYNCHRONOUS OPEN LOOP DEMODULATION CIRCUIT IN PULSE POSITION MODULATION

(75) Inventors: Chau-Chin Su, Taipei; Ming-Hwa Hue, Taipei Hsien; Chorng-Kuang Wang, Taipei, all of (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/268,245

(22) Filed: Mar. 15, 1999

(30) Foreign Application Priority Data

Oct. 19, 1998 (TW) .................................................. 87117273

(51) Int. Cl.$^7$ ............................. H03K 9/04; H04L 27/10
(52) U.S. Cl. .......................................... 329/313; 375/239
(58) Field of Search ........................... 329/313; 370/213; 375/239, 340; 359/154, 175, 142, 184

(56) References Cited

U.S. PATENT DOCUMENTS

| | | | |
|---|---|---|---|
| 5,625,652 | * 4/1997 | Petranovich | 375/355 |
| 6,055,266 | * 4/2000 | Nakamura | 375/206 |

OTHER PUBLICATIONS

F.R. Gfeller and U. Bapst, "Wireless In–House Data Communication Via Diffuse Infrared Radiation", *IEEE Proceeding*, vol. 67, No. 11, pp. 1474–1486, Nov. 1979.

J.R. Barry, et al., "High–Speed Nondirective Optical Communication for Wireless Networks", *IEEE Network*, vol. 5, No. 6, Nov. 1991, pp. 44–54.

T.H. Tsaur, et al., "A Nondirective Infrared Transceiver for Indoor High Speed Wireless Data Communication", *IEEE Trans on Consumer Electronics*, vol. 40, No. 1, pp. 20–27, Feb. 1994.

K.C. Chen, "Direct Detect Modulations of High Speed Indoor Diffused Infrared Wireless Transmission", *Proc. IEEE Personal Indoor Mobile Radio Communication*, 1994.

H.K. Lu, et al., "Prototyping of an Indoor High Speed Diffuse Infrared Tranceiver for Wireless Data Communications", *Proc. IEEE ICCS*, Singapore, 1994.

G. Ling and R. Gagliardi, "Slot Synchronization in Optical PPM Communication", *IEEE Trans. on Communications*, vol. COM–34, No. 12, Dec. 1986, pp. 1202–1208.

M.D. Audeh, J.M. Kahn, and J.R. Barry, "Performance of Pulse–Posisiton Modulation on Measured Non–Directed Indoor Infrared Channels", *IEEE Transations on Communication*, vol. 44, No. 6, pp. 654–659, 1996.

J.M. Elimirghani and R.A. Cryan, "New PPM–CDMA Hybrid for Indoor Diffuse Infrared Channels", *Electronics Letters*, vol. 30, No. 20, pp. 1646–1647, 1994.

D.C. Lee, M.D. Audeh, and Kahn, "Performance of Pulse–Position Modulation with Trellis–Coded Modulation on Non–Directed Indoor Infrared Channels", *GLOBECOM\*95*, pp. 1830–1834, 1995.

C.G. Georghiades, "Modulation and Coding for Throughput–Efficient Optical Systems", *IEEE Trans on Information Theory*, vol. 40, No. 5, pp. 1313–1326, Sep. 1994.

T.S. Chu and M.J. Gans, "High Speed Infrared Local Wireless Communication", *IEEE Communication*, vol. 25, No. 8, pp. 4–10, 1987.

\* cited by examiner

Primary Examiner—Robert Pascal
Assistant Examiner—Kimberly E Glenn
(74) Attorney, Agent, or Firm—Alston & Bird LLP

(57) ABSTRACT

A simple demodulation circuit having a reduced hardware cost and an increased using flexibility is provided. Such architecture is used in a pulse position modulation for retrieving a data from a received source signal and includes a transformation circuit operating the source signal to produce a quantized data having a plurality of data slots, a slot address detector electrically connected to the transformation circuit for reaching a peak slot address from addresses of the data slots, and a timing recovery decoder electrically connected to the slot address detector for recovering the data through decoding the peak address.

18 Claims, 15 Drawing Sheets

ARCHITECTURE OF NON-SYNCHRONOUS OPEN LOOP DEMODULATION CIRCUIT IN PULSE POSITION MODULATION

FIELD OF THE INVENTION

The present invention relates to a demodulation circuit, and more particularly to an open loop demodulation circuit.

BACKGROUND OF THE INVENTION

Recently, the personal computer is no more limited to the desk top type and the ones getting more and more popular are of portable note book type and palmtop type which are then required to be connected to the internet for data transmission. Accordingly, the wireless internet ensues. The conventional wireless transmission is completed by the radio wave, whose application, however, is linited. The radio wave will penetrate through the wall or the partitioning medium so that radio networks in different rooms will interfere with each other. IEEE 802.11 provides a good nonn in this respect and allows the user to use the ISM channel without a license but has various limitations in order to avoid the interference between different networks. To comply with these limitations, however, not only the hardware cost is increased, but also the telecommunication performance is reduced, which explains why the infrared is proposed to serve as the medium for wireless transmission.

There are advantages by using the infrared as the medium for wireless transmission. Firstly, the radio networks in different rooms will not interfere with each other and it has an excellent security or is free from eavesdropping since the infrared cannot penetrate through the wall. Secondly, the infrared has a rather wide usable bandwidth and there is no rule to regulate its use at present or in the foreseeable future. Nevertheless, there are limitations for using the infrared to serve as the medium for wireless transmission. Firstly, the infrared or the transmission will be stopped or obstructed by the indoor furnishings. Secondly, there are a great many of infrared sources in the natural environment. For example, all of the incandescent lamp, the fluorescent lamp and the natural light include the infrared component are sources of primary noises. Accordingly, the directionless indoor infrared wireless transmission becomes an emphasis to be developed.

In a directionless indoor infrared wireless transmission, the infrared is oimnidirectionally transmitted in order that the receiver can receive an enough energy through the reflection of indoor furnishings, floor and ceiling to demodulate the signal by a proper signal to noise ratio. In 1979, it is first proposed a 125 Kbit diffusion-type infrared wireless transmission system to open a new era for infrared wireless transmission. Thereafter, 1Mbit and 2Mbit systems are subsequently announced. Owing to a vigorous demand on high-speed data transmission, there already are researches on even higher speed system.

A brief introduction to the pulse position modulation (PPM) used for infrared transmission system will be given here. An N-ary PPM divides a symbol into N slots and determines the slot address where the pulse is by the value of the data it transmits. FIGS. 1A and 1B show two kinds of 4-ary PPM where a symbol has 4 slots respectively encoded as (00, 01, 11, 10). FIG. 1A is a full slot mode and FIG. 1B is a half slot mode, in which the encoded slot is called signal slot, e.g. 01.

The data are transmitted by way of packet including a preamble sequence, a training sequence and a data sequence. The preamble sequence consists of a series of 00 symbols ended with a symbol 10, by which the receiver can determine whether the transmitter is transmitting the signal to obtain the preliminary synchronization. The training sequence provides a basis by which the receiver can judge the telecommunication channel characteristics with which the receiver can avoid the channel influence through the equalizer. The data sequence includes data to be transmitted.

In the preamble sequence, the receiver is preliminarily synchronized. It requires a timing recovery circuit (TRC) to maintain the sampling synchronization upon transmitting training sequence and data sequence. Generally speaking, a TRC can be completed by a delay locked loop (DLP). FIG. 2 is a block diagram showing an infrared receiver using a DLP. Initially, the infrared signal is amplified by a preamplifier and then quantized by an analog-to-digital converter. Thereafter, the preamble sequence detector checks whether there are continuous preamble sequence signals of fixed period in the received signal. If yes, a signal will be outputted to actuate the phase detector which will check to determine whether the sampled phase has a leading or a lagging time base. If it is lagging (or leading), the delay line will be notified to reduce (or increase) the delay time in order to be in phase with the input signal.

There are advantages and disadvantages in using the DLP as the basic structure of the infrared receiver. Advantages include reducing the over-sampling multiple of the analog-to-digital converter, which enables the later digital processing module to be manipulated in a lower speed to further minimize the power consumption. Disadvantages include being difficult to converge owing to a very large noise, which will result in an interrupted reception through a sampling timing drift. Further, the conventional timing recovery mechanism using the locked loop to soundly maintain the timing stability in a relatively longer period requires a relatively long period of time to lock the phase. Since the infrared wireless transmission uses a packet structure belonging to a transmission of burst mode, it does not require a stability in a long period of time but is to be designed into one having a wider loop bandwidth in order to quickly lock the phase. Such design, however, will have a poor stability and is easily interfered by the noise. Further, the indoor infrared transmission environment is a very bad telecommunication channel so that the phase locked loop (PLL) design becomes more complicated. Accordingly, it would appear that PLL is not a good choice.

As mentioned, the indoor infrared transmmision data is transmitted in packets each of which only has about 1 thousand of symbols. In the situation of a general frequency error, the accumulated phase error will not become too large. In an example of 100 PPM frequency error, the accumulated phase error of a packet of 1 thousand of symbols only occupies 0.1 symbol period of time. In a symbol having four time slots and having a sampling speed being 8 times that of the symbol frequency where a sampling period equals to 0.125 symbol period, the accumulated phase angle error cannot even change one sampling time base. In this situation, there still is a sample located within the active time slot. In addition, if the channel noise is too large, there will be a phase jitter upon phase detection to result in a detection error affecting the accuracy of locked phase.

It is therefore tried by the applicant to deal with the above situation encountered by the prior art.

SUMMARY OF THE INVENTION

It is therefore an object of the present invention to provide a simple demodulation for a demodulation circuit architecture.

It is further an object of the present invention to provide a low hardware cost for a demodulation circuit architecture.

It is still an object of the present invention to increase the using flexibility for a demodulation circuit architecture.

It is additional an object of the present invention to provide an expansible demodulation circuit architecture.

It is yet an object of the present invention to provide a demodulation circuit architecture having a reduced telecommunication channel noise.

According to a first aspect of the present invention, an architecture of a non-synchronous open loop demodulation circuit in a pulse position modulation for retrieving a data from a received source signal comprising a transformation circuit operating the source signal to produce a quantized data having a plurality of data slots, a slot address detector electrically connected to the transformation circuit for reaching a peak address from addresses of the data slots, and a timing recovery decoder electrically connected to the slot address detector for recovering the data through decoding the peak address.

Preferably the transformation circuit includes a signal receiving module receiving and amplifying the source signal to generate a first signal, a filter electrically connected to the signal receiving module for filtering a high frequency noise and a low frequency noise out of the first signal to generate a second signal, and an analog-to-digital converter electrically connected to the filter for quantizing the second signal to generate the quantized data to be outputted to the slot address detector.

Certainly, the filter can be a bandpass filter. The source signal is a pulse position modulation signal.

Preferably the slot address detector includes a matching filter for comparing therewith the quantized data to obtain a compared result, a peak detector electrically connected to the matching filter for finding a peak from the compared result to generate a pulse signal synchronous with the peak, and a peak address counter electrically connected to the peak detector for counting the pulse signal in order to determine the peak address whenever the pulse signal appears a pulse, to be outputted to the timing recovery decoder.

Preferably the matching filter includes a shifting register for registering the quantitzed data, and a summation circuit electrically connected to the shift register for summing what is stored in the register to generate the compared result to be outputted to the peak detector. Generally, the peak corresponds to a specific slot address of the source signal and is detected when a value of the compared result is larger than adjacent values of the compared result.

Preferably the timing recovery decoder includes a preamble detector detecting a preamble sequence of the source signal through a series of the peak address to generate a starting signal, a symbol timing recovery circuit electrically connected to the preamble detector and actuated by the starting signal to detect a symbol start address of the source signal from the series of peak addresses, and a demodulator electrically connected to the timing recovery circuit for demodulating from the series of peak addresses and the symbol start address the data to be outputted.

Certainly, the the preamble detector can be a confidence counter. The symbol timing recovery circuit can include a register registering the symbol start address and an accumulated error between a respective the peak address and the symbol start address, and an adder electrically connected to the register for adding a phase error between the respective peak address and the symbol start address to the symbol start address and the accumulated error. The bit distance between the symbol start address and the phase error is set to determine a loop bandwidth of the symbol timing recovery circuit.

Preferably the demodulator includes a substractor for subtracting a respective the peak address by the symbol start address, an adder electrically connected to the substractor for adding a constant to a difference between the respective peak address and the symbol start address, and a missing symbol detector electrically connected to the adder for comparing the respective peak address and a preceding peak address to check whether there is a missing symbol. Certainly, the demodulator can be a software for demodulating a respective the peak address stored in a memory unit. The source signal can be an infrared signal through an offset differential pulse position modulation. Tile offset differential pulse position modulation can be modulated by an operation equation of Ti=D+di*R+S where Ti is symbol period, D is offset, di is the data, R is the unit waiting time and S is required infrared transmitting time.

Certainly, the offset differential pulse position modulation can be demodulated by an operation equation of di=(Ti−D−S)÷R where Ti is symbol period, D is offset, di is the data, R is the unit waiting time and S is required infrared transmitting time wherein the offset differential pulse position modulation records first a detected peak address and then demodulated by a software.

The present invention may best be understood through the following descriptions with reference to the accompanying drawings, in which:

DETAILED DESCRIPTION OF THE PREFERRED EMBODIMENTS

Figure 1B:
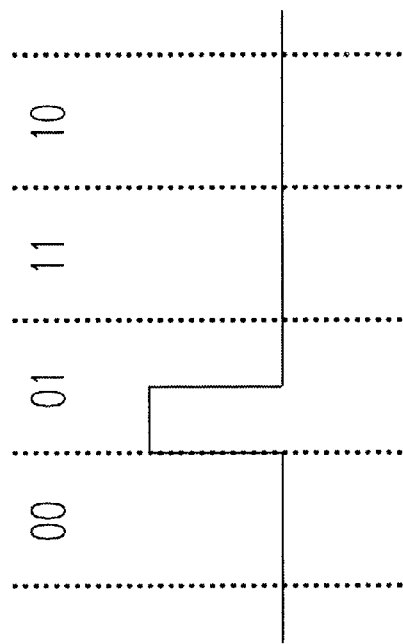
FIGS. 1A and 1B are schematic views respectively showing two kinds of 4-ary PPM of different time slots.
Figure 1A:
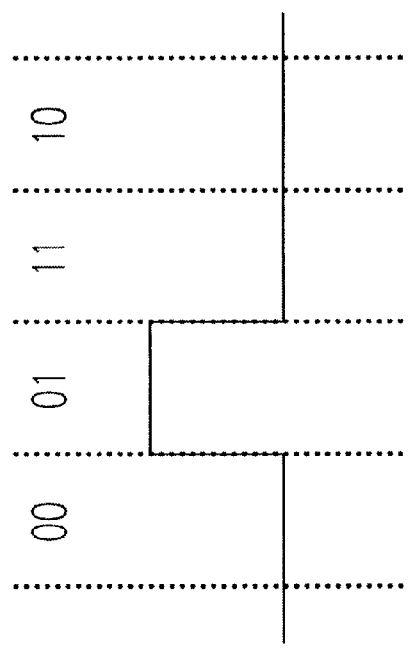
Figure 2:
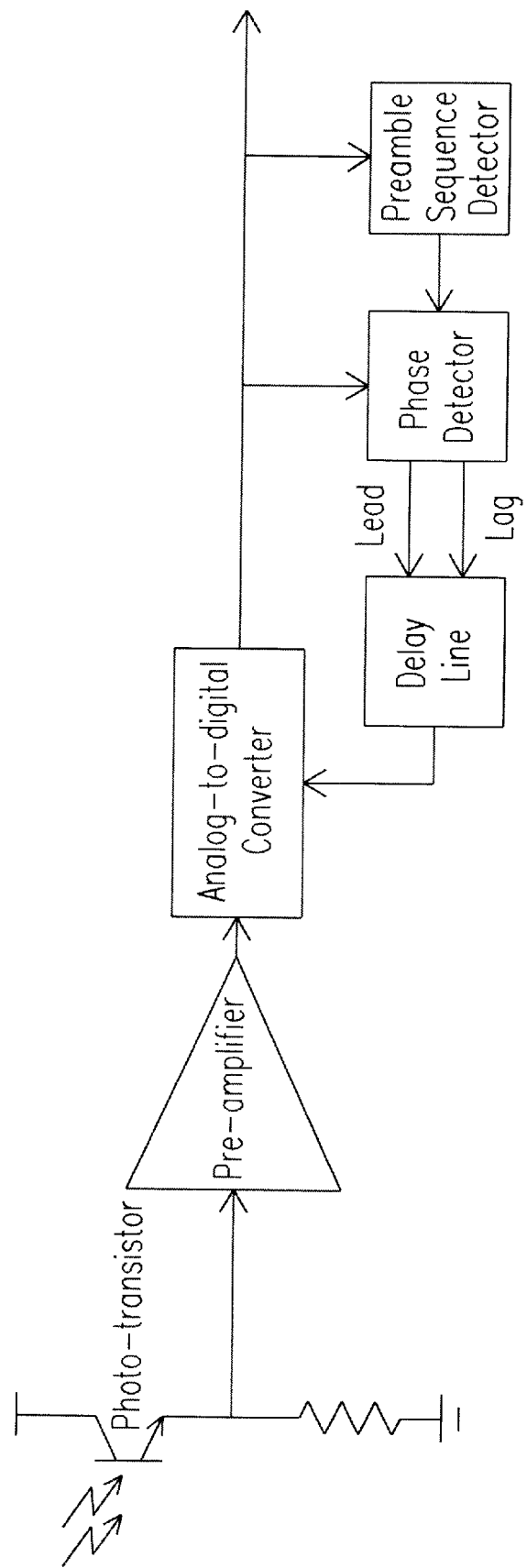
FIG. 2 is a schematical view showing a sampling timing recovery circuit architecture for the general infrared PPM according to the prior art.
Figure 3:
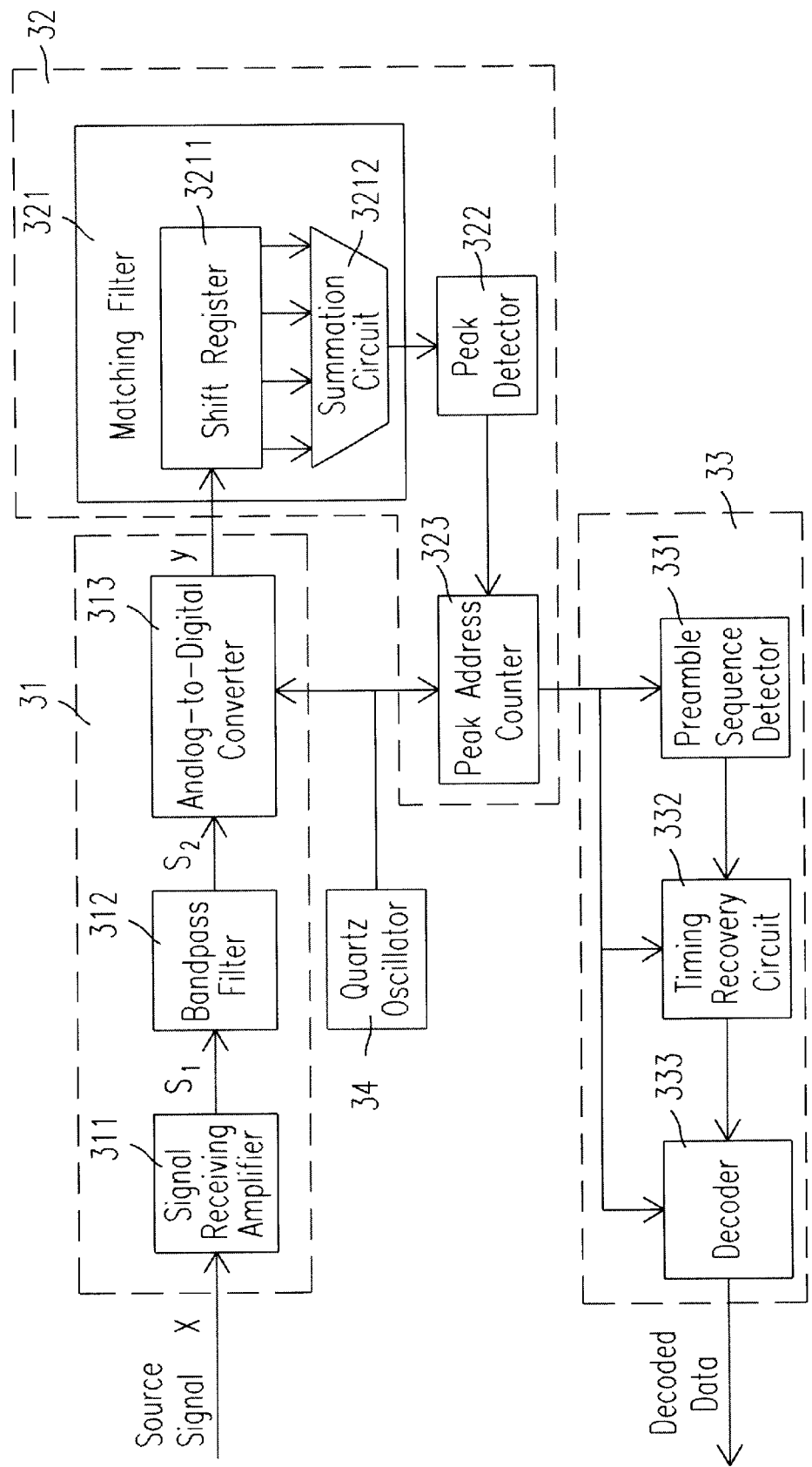
FIG. 3 is a block diagram showing an architecture of a non-synchronous open loop demodulation circuit in a pulse position modulation according to the present invention.

Referring now to FIG. 3, there is shown a preferred embodiment of an architecture of a non-synchronous open loop demodulation circuit in a pulse position modulation for retrieving a data from a received source signal x, e.g. a pulse position modulation signal according to the present invention. The architecture includes a transformation circuit 31 operating source signal x to produce a quantized data having a plurality of data slots, a slot address detector 32 electrically connected to transformation circuit 31 for reaching a peak address from addresses of the data slots, and a timing recovery decoder 33 electrically connected to slot address detector 32 for recovering the data through decoding the peak address.

Transformation circuit 31 includes a signal receiving module 311 receiving and amplifying source signal x to generate a first signal s1, a bandpass filter 312 electrically connected to signal receiving module 311 for filtering a high frequency noise and a low frequency noise out of first signal s1 to generate a second signal s2, and an analog-to-digital converter 313 electrically connected to filter 312 for quantizing the second signal to generate the quantized data y to be outputted to slot address detector 32. Slot address detector 32 includes a matching filter 321 for comparing therewith the quantized data to obtain a compared result, a peak detector 322 electrically connected to matching filter 321 for finding a peak from the compared result to generate a pulse signal synchronous with the peak, and a peak address counter 323 electrically connected to peak detector 322 for counting the pulse signal in order to determine the peak slot address whenever the pulse signal appears a pulse, to be outputted to timing recovery decoder 33. Matching filter 321 includes a shifting register 3211 for registering quantitzed data y, and a summation circuit 3212 electrically connected to shift register 3211 for summing what is stored in register 3211 to generate the compared result to be outputted to peak detector 322. When the peak is detected, the counted address of peak address counter 323 is the peak address. Timing recovery decoder 33 includes a preamble sequence detector 331 detecting a preamble sequence of source signal x through the detection of a regularly periodical appearance of a series of the peak address to generate a starting signal, a symbol timing recovery circuit 332 electrically connected to preamble detector 331 and actuated by the starting signal to detect or lock a symbol start address of source signal x from the series of peak address, and a demodulator 333 electrically connected to timing recovery circuit 332 for demodulating from the series of peak address and the symbol start address the data to be outputted.

In the following descriptions, we use adjustable parameters in order not to be limited in application and we use the 10 Mbps 4-ary PPM technique for convenience of illustration. Although the high speed indoor infrared wireless transmission has not become a standard, the data quoted below are not far from practical application.

Bandpass filter 312 has both lowpass filtering function and highpass filtering function. The latter is directed to filter the biassing direct current signal of the photosensitive transistor and the noise interference of the indoor artificial illumination, e.g. incandescent lamp or fluorescent lamp, having a basic frequency of 120 Hz alternate signals. The former is directed to filter the higher general frequency noise primarily coming from the natural light and the photosensitive transistor. Highpass and lowpass frequencies of the bandpass filter primarily depend on the main bandwidth range of the transmitted signal. In addition, the choice of the highpass frequency should consider the transformation of the PPM signal as a result of the highpass filtering. In a 10Mbps 4-ary PPM technique, the bandpass range is selected to be between 100 KHz to 20 MHz since the symbol frequency is 5 MHz and the time slot frequency is 20 MHz.

The main purpose of analog-to-digital converter (ADC) 313 is to quantize the received analog signal into a quantized data y. The sampling speed is to take K samples in each time slot which in turn means that there are MK samples in each symbol. Generally, K must be larger than 2 which means that we takes two samples in a time slot in order to secure that there is at least a sample which is properly situated in the time slot. In addition, through two samples, we can detect the sampling phase error. In a preferred embodiment, K=4.

The sampling time base of ADC 313 is generally adjustable. A sampling timing recovery circuit is generally used to find the optimum sampling phase in order to enhance the signal-to-noise ratio and to obtain a reduced data decoding error rate. Under a strong noise interference, the error normally will be effectively reconverged only after a relatively long period of time. It is such unfavorable environment, the indoor infrared transmission will have. It is especially true when the transmission is high speed. It is therefore proposed in the present invention that a quartz oscillator is directly utilized to generate a stable oscillating signal in order to obtain a sampling timing of a very low phase jitter. As to the phase drift, it will be handled and reduced in a very simple method as will be described later. As such, the sampling timing recovery circuit is no more necessary, and both of the hardware cost and the design complexity of the overall circuit are reduced. In a 10 Mbps 4-ary PPM, the sampling frequency must be at least 40 MHz. It is possible to control the phase in a 40 MHz frequency. Nevertheless, it is uneasy to accurately control and the circuit complexity will be very high.

Figure 4:
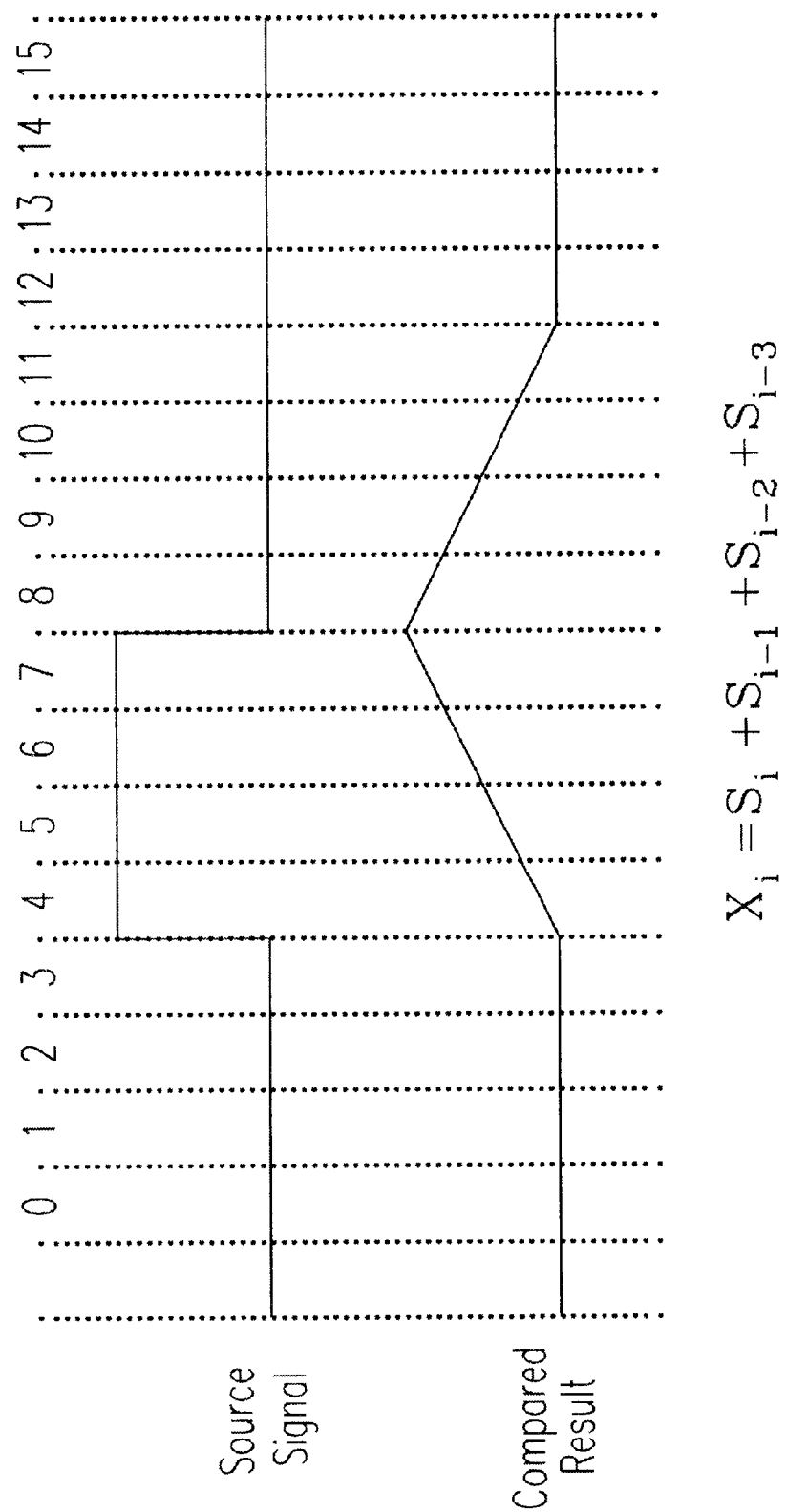
FIG. 4 is a plot showing the compared result made by a matching filter for a PPM signal according to the present invention.

Matching filter 321 is an important feature of the present invention, which simplifies the digital signal processing and the decoding process in the later stage. Matching filter 321 has a comparing target of a signal time slot. Shift register 3211 will sequentially register quantized data y. If the sampling frequency is K times of the time slot frequency, the length of shift register 3211 will also be K. Summation circuit 3212 will sum together all data in shift register 3211 in order to output the summed data at each sampling time. If all of quantized data y in a time slot are included in shift register 3211, the summed result of summation circuit 3212 will be the largest. FIG. 4 shows the result that matching filter 321 matches against the PPM signal where the upper half shows the source PPM signal and the lower half shows the matched result.

Advantages of using matching filter 321 includes that the PPM signal can be decoded through a simple peak detection as shown by the output result in FIG. 4, and that the signal-to-noise ratio (SNR) will be enhanced through the sampling integration therein. Integrating the result K times will enhance the SNR by 10 Log K dB (which equals to 6 dB when K=4), which will lower burdon and complexity of the lowpass portion in the bandpass filter. Generally, the lowpass portion in the bandpass filter has a higher 3 dB frequency and relates to a circuit design of higher complexity and expense. Furthermore, matching filter 321 has a very simple and regular stricture and is very suitable for use in the fabrication of very large scaled integrated (VLSI) circuit. Since it does not need a large K, that K=4 is enough for a 10 Mbps 4-ary PPM system. The resulting peak will not deviate too much. When compared with the general timing recovery circuit usually sampling at two times the base frequency, it is extremely advantageous for the present invention to use a matching filter to substitute the complex timing recovery circuit.

Peak detector 322 detects where the peak is located. As shown in FIG. 4, the peak occurs at the trailing edge (of the $8^{th}$ time base) of the signal time. When the peak is detected, what peak address counter 323 has counted will be the peak address. The peak detector 322 has a very simple circuit principle. Specifically, it will detect whether a specific matching integrated value is larger than adjacent ones and exceeds a predetermined critical value. The peak detection can be described by the following equation (1):

$$Xi \geq Vth, Xi \geq Xi-j, Xi > Xi+j \text{ for } 1<j<J \quad (1)$$

where J is a designer selected value and has a maximum value of K−1, and Vth is a predetermined critical value. Specifically, as long as Xi is larger than J adjacent values both located at two sides thereof and exceeds Vth, it can be identified as a peak. J and Vth can be default values and can alternatively be automatically adjustable according to the channel characteristics. If Vth gets larger, J can become smaller. The compromise theories are that the larger Vth is, the larger the probability of peak miss will be and that the small Vth is, the larger the probability of peak false alarm will be, between which a designer can optimally choose. From Equation (1), we know the hardware structure of the peak detector will not be too complicated but will be very regular to facilitate the fabrication of VLSI. In the present preferred embodiment, J is set to be 2, and Vth is set to take the theoretical value of 3 dB (0.707) so that only 5 comparators are required to implement therefor.

Peak address counter 323 is a common counter. When peak detector 322 detects the peak, it will output the then-counted value to be the peak address and has a counted maximum equal to the sampled number (MK) in a symbol period. The length of the counter is $Log_2(2MK)$. In the present exemplary system, both M and K are 4, the length of peak address counter 323 is 4 bits so that it can count from 0 to 15, which makes it clear that peak address counter 323 will not have a big hardware burdon. Peak address counter 323 is a free counting counter, is inputted from the quartz oscillator, and is not intentionally controlled since this module is the sole sequential circuit as opposed to all the rest combination circuits. This is because a complex control will constrict a bottleneck under a high speed transmission. It is to be noticed that the speed of the rest combination circuits can be increased through a simple pipelined architecture.

Preamble detector 331 detects whether a preamble sequence is detected by checking whether the peak repetitively and regularly appears. The preamble sequence is a series of continuous 00 symbols spaced by M×K sampling times so that if continuous in peaks evenly spaced by M×K sampling times are detected, we can determine the peak is detected. m is a design parameter given by the designer. Influenced by the noise, adjacent peaks are not usually spaced by M×K sampling times so that an appropriate error d is assumed.

Figure 5:
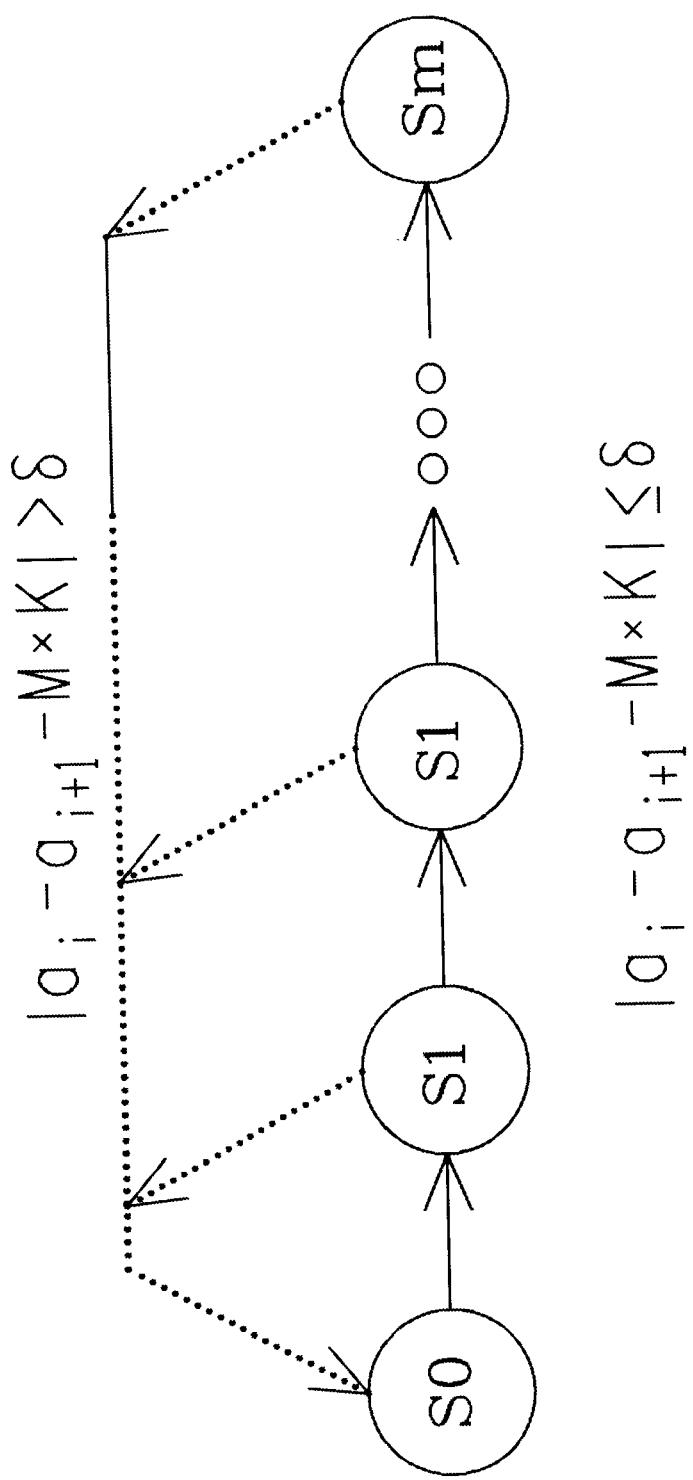
FIG. 5 is a state diagram showing a confidence counter for detecting the preamble sequence according to a preferred embodiment of the present invention.

Preamble detector 331 can be a confidence counter having a state diagram as shown in FIG. 5. With an initial state S0, the state will advance a step every time when adjacent peaks are spaced within M×K±δ, and will back to initial state S0 whenever there are adjacent peaks spaced beyond M×K±δ. Accordingly, if the state is advanced to Sm, it denotes that there are continuous in peaks every adjacent two of which are spaced with M×K sampling times so that in the Sm state, a signal can be generated to announce that a preamble sequence is detected.

Figure 7:
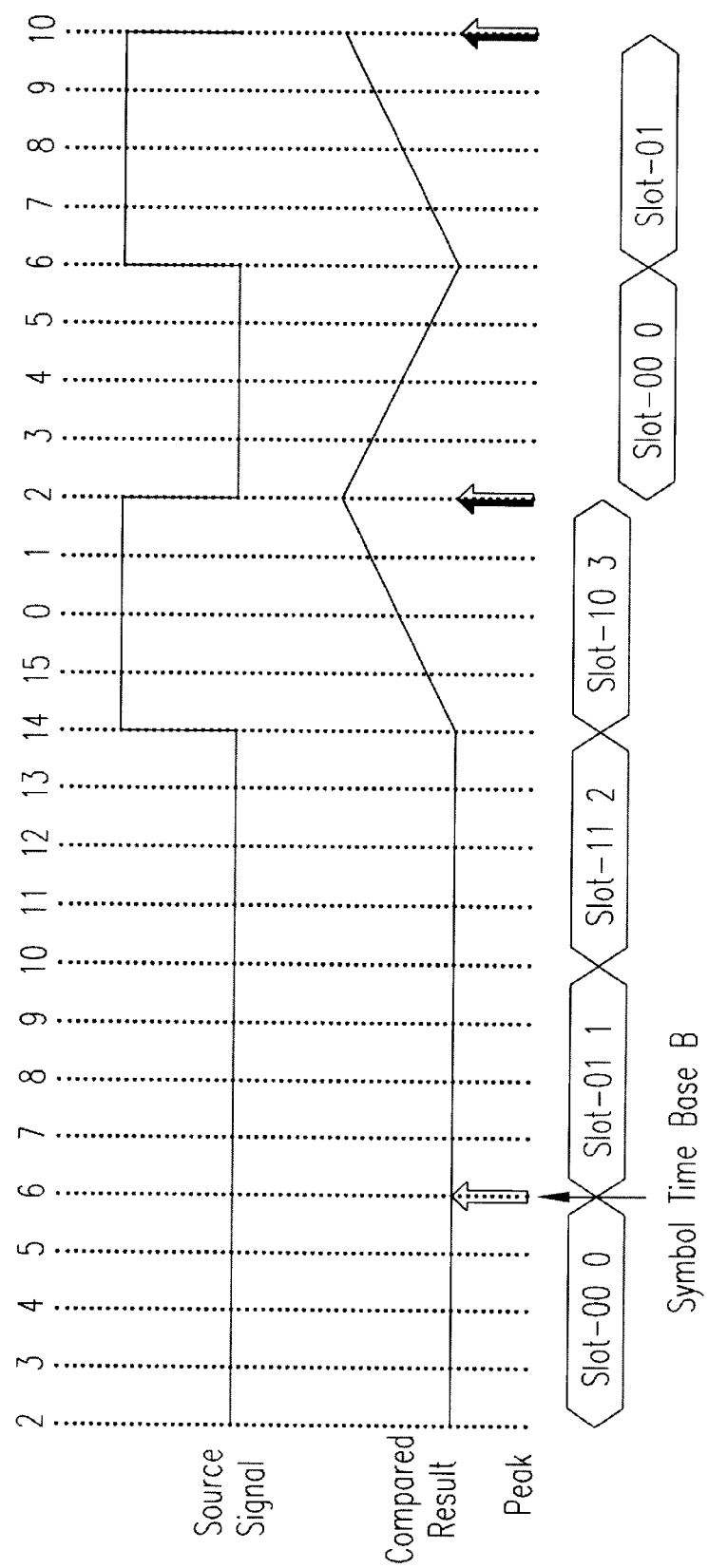
FIG. 7 is a diagram showing how the data is demodulated according to the present invention.

Timing recovery circuit 332 is primarily to obtain the symbol starting address B by which the data can be decoded. Since the transmitter and the receiver might exist therebetween a frequency error, symbol starting address is not constant at all times and the symbol starting address of the receiver must change with the transmitter when appropriate, in order to obtain a better signal-to-noise ratio upon data decoding. The task of timing recovery circuit 332 is to check whether the peak address in the signal time slot falls at the predetermined location. If not, the symbol starting address will be correspondingly corrected. As shown in FIG. 7, the peak addresses of the signal time slot should fall respectively at addresses (6, 10, 14, 2). Owing to the frequency error, they might be getting deviated. If the receiver has a lower (or higher) frequency, the peak addresses will respectively drift toward addresses (5, 9, 13, 1) [or (7, 11, 15, 3)]. The drifting speed is determined by the magnitude of the frequency error.

Upon data decoding, timing recovery circuit 332 checks the K divided residue in equation (2) to be described later. If there is a residue, the residue can be regarded as the phase error which should be accummulated for correcting the symbol starting address in a proper opportunity. Such operation is similar to the general phase locked loop. Generally, the phase locked loop uses a lowpass filter to accumulate the phase error in order to control the voltage controlled oscillator for correcting the phase. Different from the conventional method, timing recovery circuit 332 does not control the sampling timing of the ADC. The present invention functions at a lower symbol frequency and has a speed being only one MKth of the sampling frequency so that the hardware structure can be simplified and the power consumption can be economized.

Figure 6:
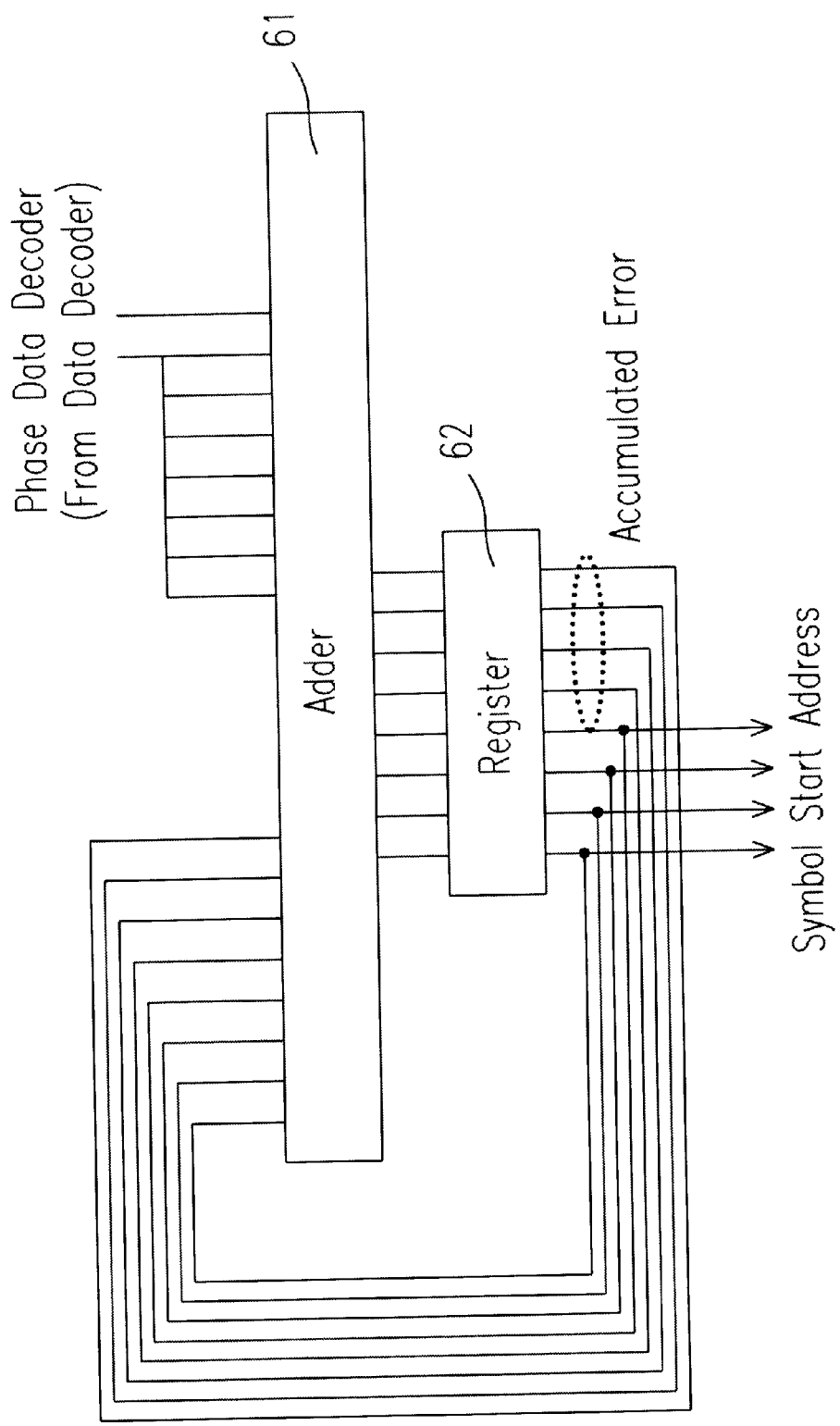
FIG. 6 is a block diagram showing a timing recovery circuit according to the present invention.
Figure 8:
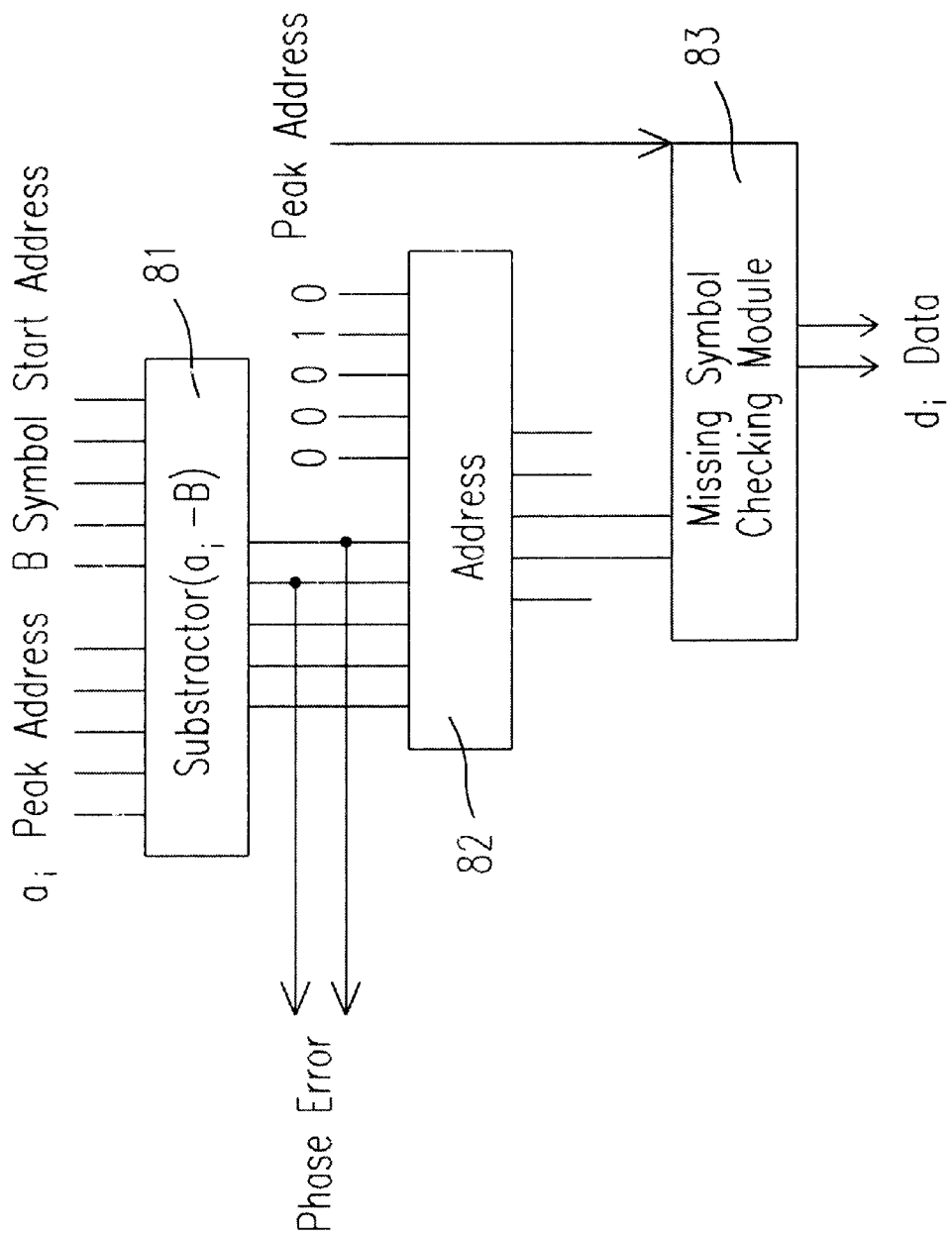
FIG. 8 is a block diagram showing a data demodulation circuit according to a preferred embodiment of the present invention.

Another feature of timing recovery circuit 332 is that it can include only an accummulator by which the symbol starting address can be generated in the way as occurred in the voltage controlled oscillator. As shown in FIG. 6, timing recovery circuit 332 includes a register 62 and an adder 61 to constitute an accummulator. The starting data of register 62 is the symbol starting address detected by preamble sequence detector 331. The phase error signal coming from the data demodulator 333, as shown in FIG. 8 to be described later, will be given the positive or negative sign and added with the symbol starting address to be registered in register 62. If the phase error is kept the same, the symbol starting address will be corrected after a certain period of time, in order to chase the transmitter address. The chasing speed is determined by the bit distance between the symbol start address and the phase error, equal to the distance between the lowest digits (or places) of the symbol start address and the phase error signal.

Ideally, the bit distance can be set to 0, i.e. the receiver chases the transmitter immediately. Nevertheless, since the noise can be regarded as the phase jitter, a lowpass loop filter is required to eliminate the noise and raise the the stability. As shown in FIG. 6, since the bit distance is 4, the symbol starting address can successfully chase only after there are 16 phase errors of 1. The bit distance is determined by desired locking range and locking time, and is related to the loop bandwidth. The larger (or smaller) the bit distance is, the smaller (or larger) the loop bandwidth will be, the longer (or shorter) the locking time will be, and the larger (or smaller) the noise tolerableness and exclusiveness will be.

Data demodulator 333 demodulate data according to the peak address and the symbol start address (B) generated by timing recovery circuit 332. Data demodulation is performed according to the following equation (2):

$$d_i = \{(a_i - B) \div K\} \cdot \text{mod} \cdot M \qquad (2)$$

where $a_i$ is the peak address, $d_i$ is the peak slot address (or index) and B is the symbol starting address. As shown in FIG. 7, the upper wave is the source output signal x, the middle second wave is the compared result obtained from matching filter 321, the middle bold arrows are peaks detected by peak detector 322, and the lower row shows symbol time base generated by timing recovery circuit 332. Since the symbol time base is 6, the first peak address is 2 which will have a demodulated result of −1 which means 3 in the mod 4 operation so that the represented data is 10.

In Equation (2), mod 4 needs not a special operation since 2's complement annotation of −1 is "11" or 3. The second peak address 10 which will have a demodulated result of 1 so that the slot represented code is 01. Demodulator 333 is very simple and can be preformed by a substractor 81. Divided by 4 can be completed by shifting and mod 4 operation can be done by taking the effective places. Due to the noise interference and the time base jitter, the peak address might not occur accurately at the desired position so that upon demodulating, a slight peak drift must be allowed or a rounding operation is required. The whole demodulation procedure can be performed by the circuit shown in FIG. 8, in which substractor 81 obtaining the distance between the peak address and the symbol start address, and an adder 82 electrically connected to substractor 81 for performing the rounding operation. It is to be noticed that removing the last two bits means dividing by 4.

Figure 9:
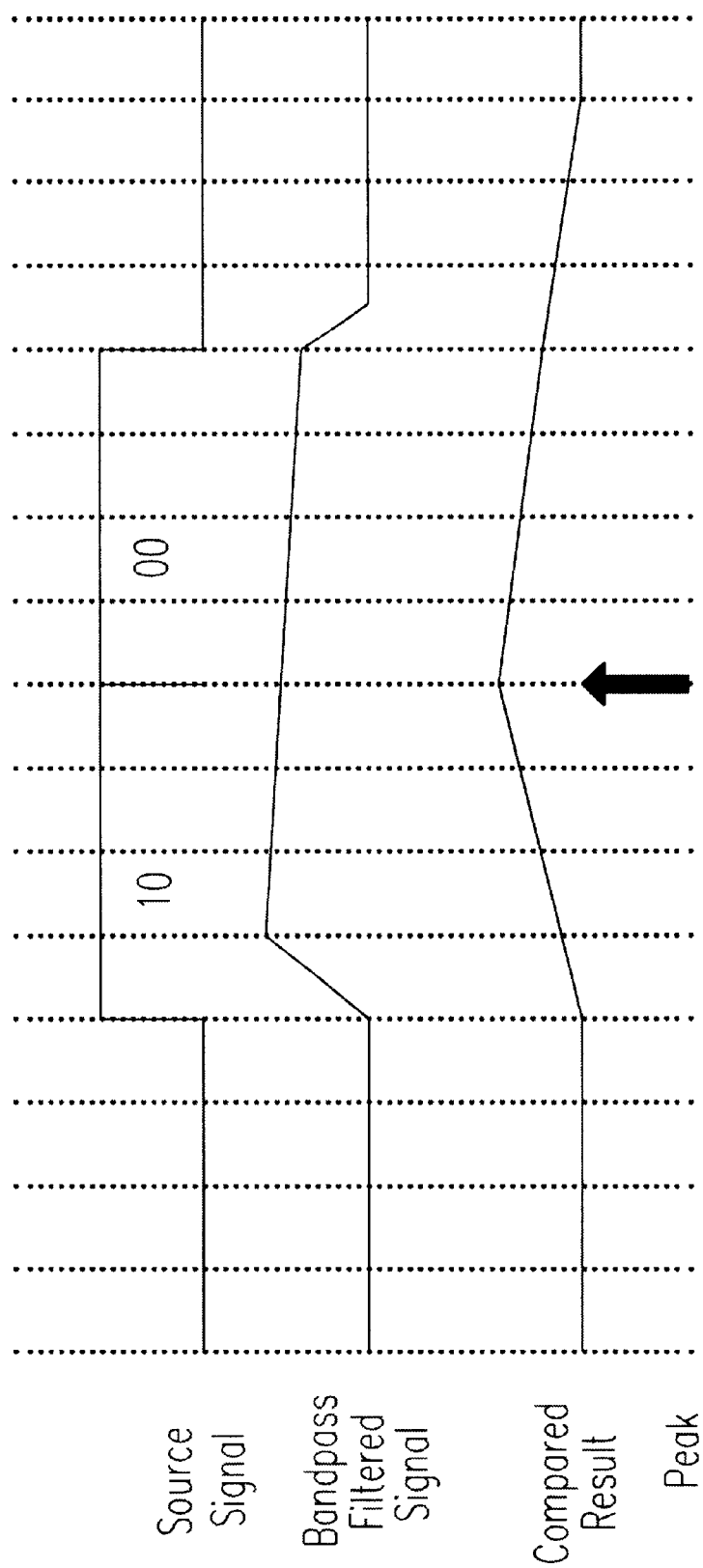
FIG. 9 is a diagram illustrating the interference of adjacent slots and the demodulation of the missing symbol according to the present invention.

If two adjacent symbols respectively reside in two adjacent slots, 10 and 00, it will be decided that there is a peak so that a special treatment is required. As shown in FIG. 9, the first row is the transmitted source signal where symbols have adjacent s. The second row schematically shows the bandpass filtered signal whose wave-shape change depends on parameters of the bandpass filter. Specifically, the low-pass portion decides the dynamic transient speed but the highpass portion decides the direct current depression degree in the steady state. The third row shows the compared result through the matching filter. The fourth row shows the detected peak. As shown in FIG. 9, when adjacent peaks respectively reside in adjacent s, only one peak will be detected but the other peak will be lost. Such problem can easily be overcome by introducing an additional module.

The missing symbol detector 83 electrically connected to adder 82 for comparing the respective peak address and a preceding peak address to check whether there is a missing symbol. Generally, if no symbol is detected between two symbol starting addresses, it is decided that there is a missing symbol. If there is a missing symbol and the preceding symbol is the last slot (10), a first slot (00) is introduced to supplement the missing symbol.

A great advantage to use the peak address for demodulation is that the demodulation can be performed by a software. Specifically, after a series of detected peak addresses are transmitted back to the computer, the computer can demodulate according to Equation (2) so that a greater flexibility can be obtained to cope with a more unique channel environment or the hardware application range can be extended by changing the demodulating mode.

The indoor infrared wireless transmission effected by pulse position modulation (PPM) will suffer the following two difficulties: the inter-symbol interference and the multipath interference, which are conventionally solved both by equalizers. In order to function the equalizers, the training sequence is necessary upon transmission. Nevertheless, the introduction of the training sequence means that the transmission efficiency is reduced. In order to cope with this problem, it is now proposed a new pulse position modulation technique, called offset differential pulse position modulation (OD-PPM) which makes a higher transmission efficiency possible and solves the above-mentioned interferences without equalizer and training sequence.

Figure 10C:
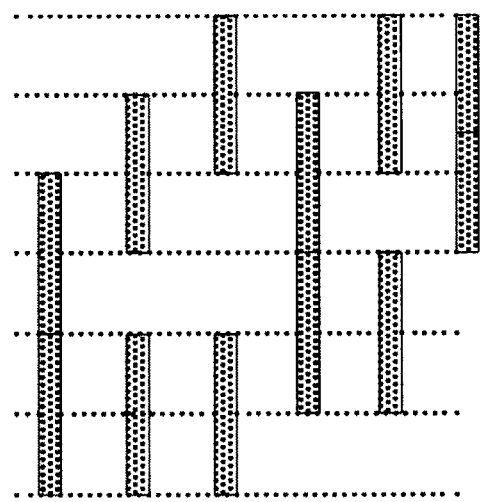
FIGS. 10A~10C are schematical views respectively showing modulation techniques for PPM, OPPM and MPPM.
Figure 10B:
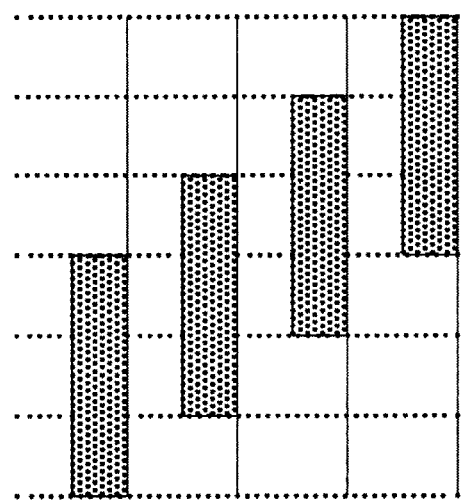
Figure 10A:
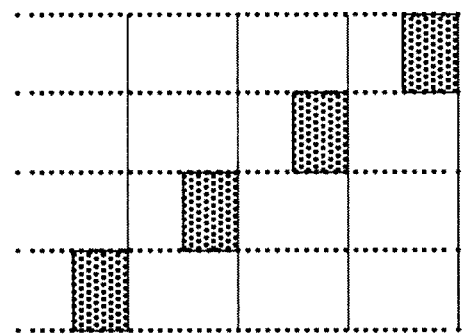
Figure 11:
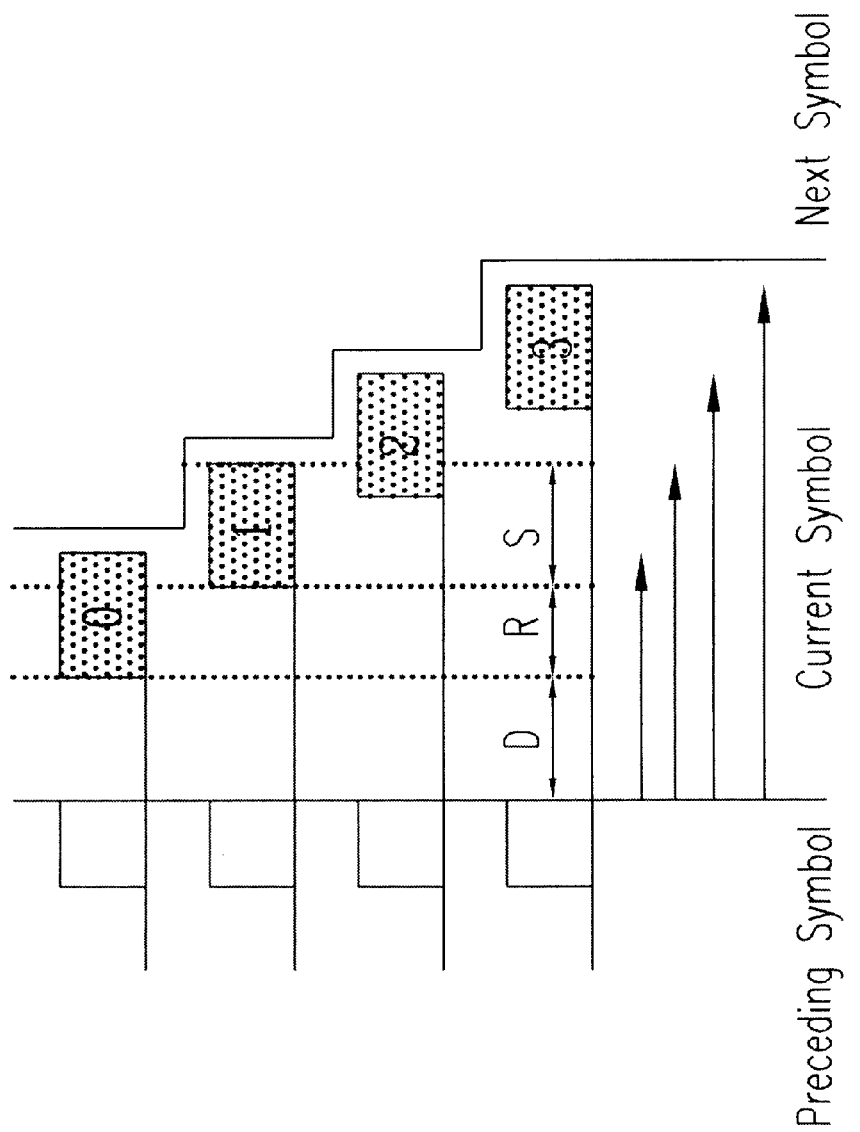
FIG. 11 is a schematical view showing a modulation technique for an ODPPM.
Figure 12A:
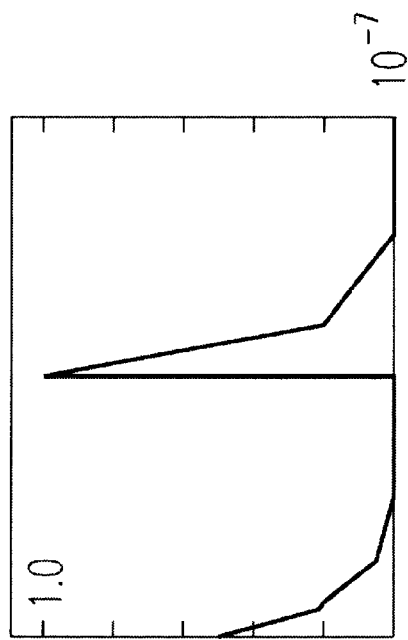
FIGS. 12A~12D are infrared wireless transmission channel models respectively for large room direct path, large room diffuse path, small room direct path and small room diffuse path.
Figure 12B:
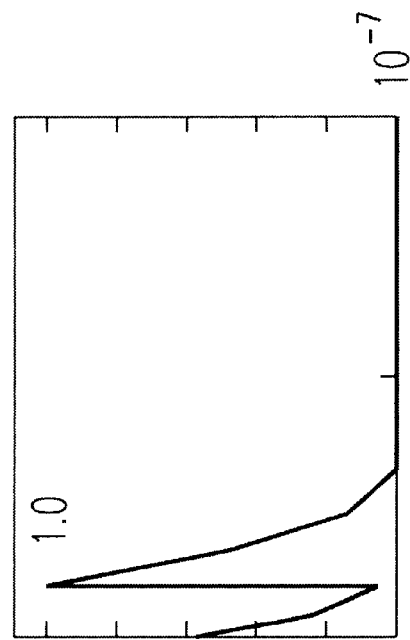
Figure 12C:
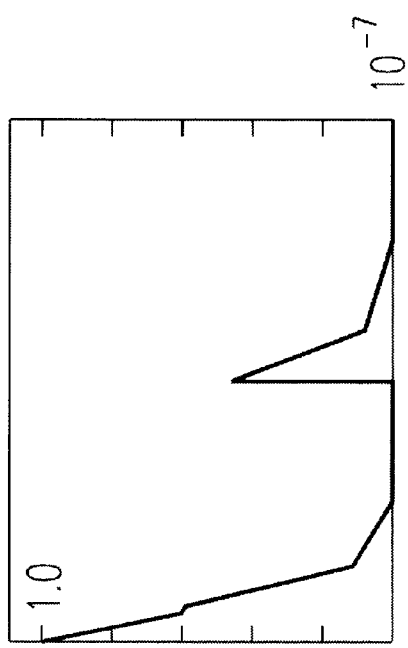
Figure 12D:
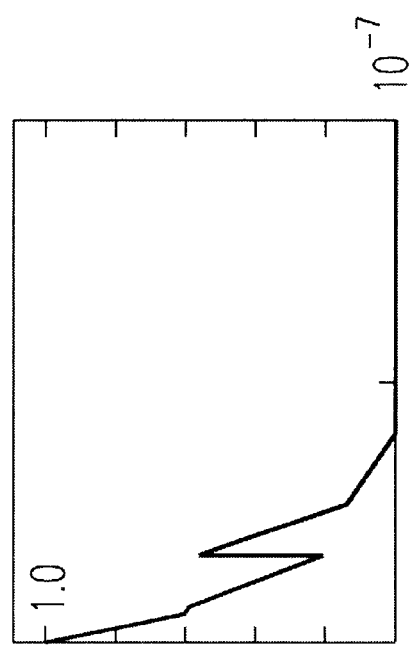

OD-PPM is dissimilar to the conventional PPMs using signal s for coding at fixed positions. As shown in FIGS. 10A–10C, conventional modulation techniques include PPM, OPPM (Overlapping PPM) and MPPM (combinatorial PPM). The later two were proposed to increase the infrared energy and thus the transmission efficiency and are generally used in optical fiber transmission. The basic time bases of these PPM must consider at the same time multipath interference and the maximum resolution of the transmission receiving environment, either of which must be excused away by the design tolerance. In the present OD-PPM, the above two considerations are separated in order to increase the transmission efficiency. As shown in FIG. 11, the preceding symbol will end when its signal slot ends. The entire symbol period will end at the ending address of the current signal, and can be calculated by the following equation (3):

$$Ti = D + di \times R + S \qquad (3)$$

where Ti is period of $i^{th}$ symbol, D is offset, di is the data, R is the unit waiting time and S is required infrared transmitting time. At first, adjacent signal slots must have an interval of D unit times in which the unit time is the maximum resolution of the transmitting or receiving time and generally is the sampling period of the ADC. According to the value of the data, it is decided how many R unit times of waiting time are required, and then a signal slot of S unit times is transmitted. As shown in FIG. 11, if the data is 00, the total symbol period is D+S. If the data is 3, the symbol period will be D+3R+S. D or the offset is determined by the maximal delay spread in the multipath. Thus, we can separate but take care of the following considerations at the same time. Firstly, the influence of multipath and inter-symbol interferences can be minimized through the setting of D. Secondly, the infrared energy can be increased through the setting of S in order not to relatedly influence the transmission efficiency. Thirdly, the transmission efficiency can be enhanced by reducing the R value.

In the present preferred embodiment, M=K=4 so that a symbol period equals to 16 unit times. Under the same conditions, the slot distance is 4 and the slot width is also 4 so that we fix D=R=S=4. Such symbols have an averaged period of 14 unit times averaging among 8, 12, 16 and 20. As such, the transmission efficiency is increased by 12.5%. Using peak address demodulation, the demodulation can be completed by the following equation (4):

$$di = (Ti - D - S) \div R \qquad (4)$$

where the parameters are the same with Equation (3).

A great advantage of ODPPM is that values of D, R and S can be adjusted in response to the telecommunication channel state in order to obtain the optimal transmission efficiency. Under such adjustable modulation mode, the demodulation can be performed by a software. The receiver of ODPPM needs only transmit to the computer a series of detected peak address, the computer will demodulate according to Equation (4) with predetermined parameters.

The feasibility of the present invention will be illustrated by the simulation results to be described in the following. The simulated environments include the direct current bias coming from the photo transistor, the alternate current low frequency noise originating from the artificial lamp and the high frequency noise coming from the natural light. The former two are far more larger than the PPM signal and the latter is tantamount to the PPM signal. Channel modes include 4 combinations of large and small rooms, and direct and diffuse paths as shown in FIGS. 12A~12D.

Table 1 tabulates specifications of the present illustrating system.

TABLE 1

| | |
|---|---|
| Data rate | 10 Mbps (M bits per second) |
| Modulation Type | 4-ary PPM (2 bits/symbol) |
| Symbol Rate | 5 MHz |
| Slot Rate | 20 MHz |
| Data Packet | 2048 bits (1024 symbols) |
| Preamble Sequence | 70 bits (32 symbols) |
| Training Sequence | 256 bits (128 symbols) |
| Data Sequence | 1742 bits (871 symbols) |
| Packet Period | 0.2048 ms |

Table 2 lists variables in the present preferred embodiment.

TABLE 2

| | Variable | Example |
|---|---|---|
| Data Rate | Rd | 10 Mbps |
| Number of Slots | M | 4 (4-ary) |
| Symbol Rate | $R_{symbol} = Rd \div \log_2 M$ | 5 MHZ |
| Slot Rate | $R_{slot} = M \times Rd \div \log_2 M$ | 20 MHz |
| Sampling Rate | Fs | 80 MHz |
| Samples Per Slot | $K = fs \div R_{slot}$ | 4 |
| Packet Size (bits) | $N = Np + Nt + Nd$ | 2048 |
| Preamble Length (bits) | Np | 70 |
| Training length (bits) | Nt | 256 |
| Data length (bits) | Nd | 1742 |

Table 3 tabulates the simulated channel environments wherein the magnitude of the PPM signal is normalized to 1, the noise is referred to the high frequency noise, and the direct current and the low frequency alternate current noises are at least 10 times larger than the transmitted signal.

TABLE 3

| Test | Room | Path | Noise |
|---|---|---|---|
| Test 1 | Small | Direct | 0.4 |
| Test 2 | Small | Direct | 0.8 |
| Test 3 | Small | Diffuse | 0.4 |
| Test 4 | Small | Diffuse | 0.8 |
| Test 5 | Large | Direct | 0.4 |
| Test 6 | Large | Direct | 0.8 |
| Test 7 | Large | Diffuse | 0.4 |
| Test 8 | Large | Diffuse | 0.8 |

Figure 13:
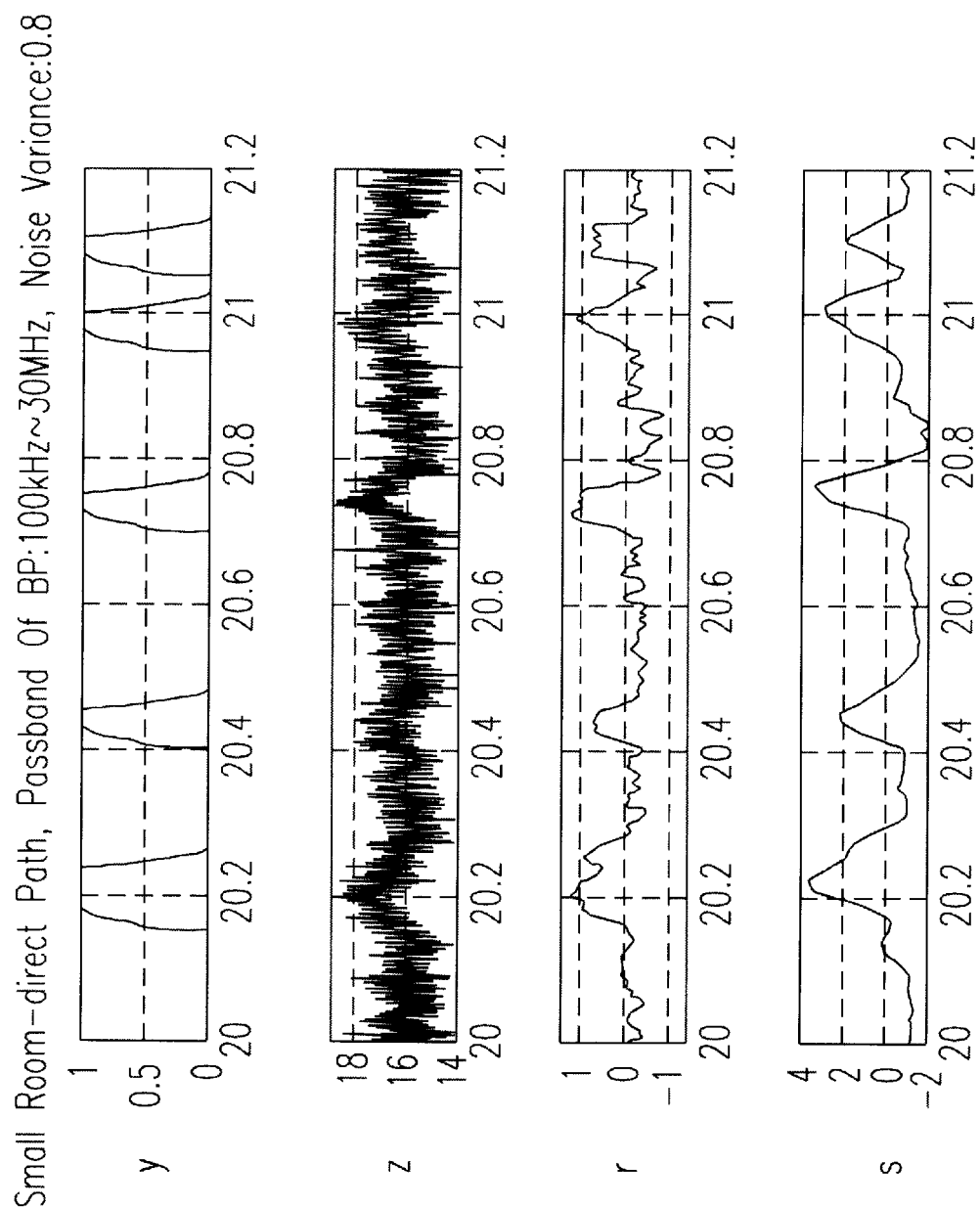
FIGS. 13~15 are selected simulation results for tests performed by the Applicant according to the present invention.
Figure 14:
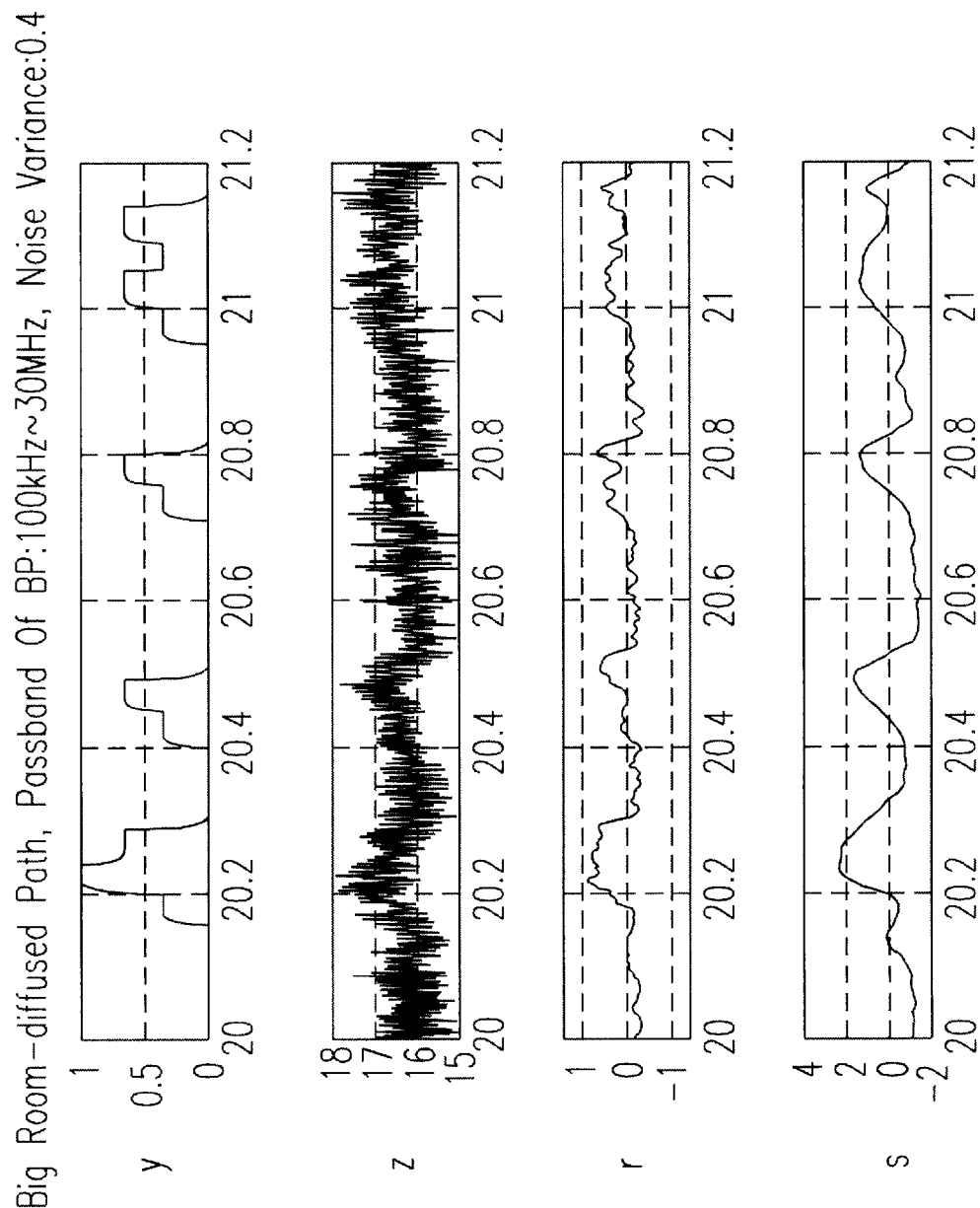
Figure 15:
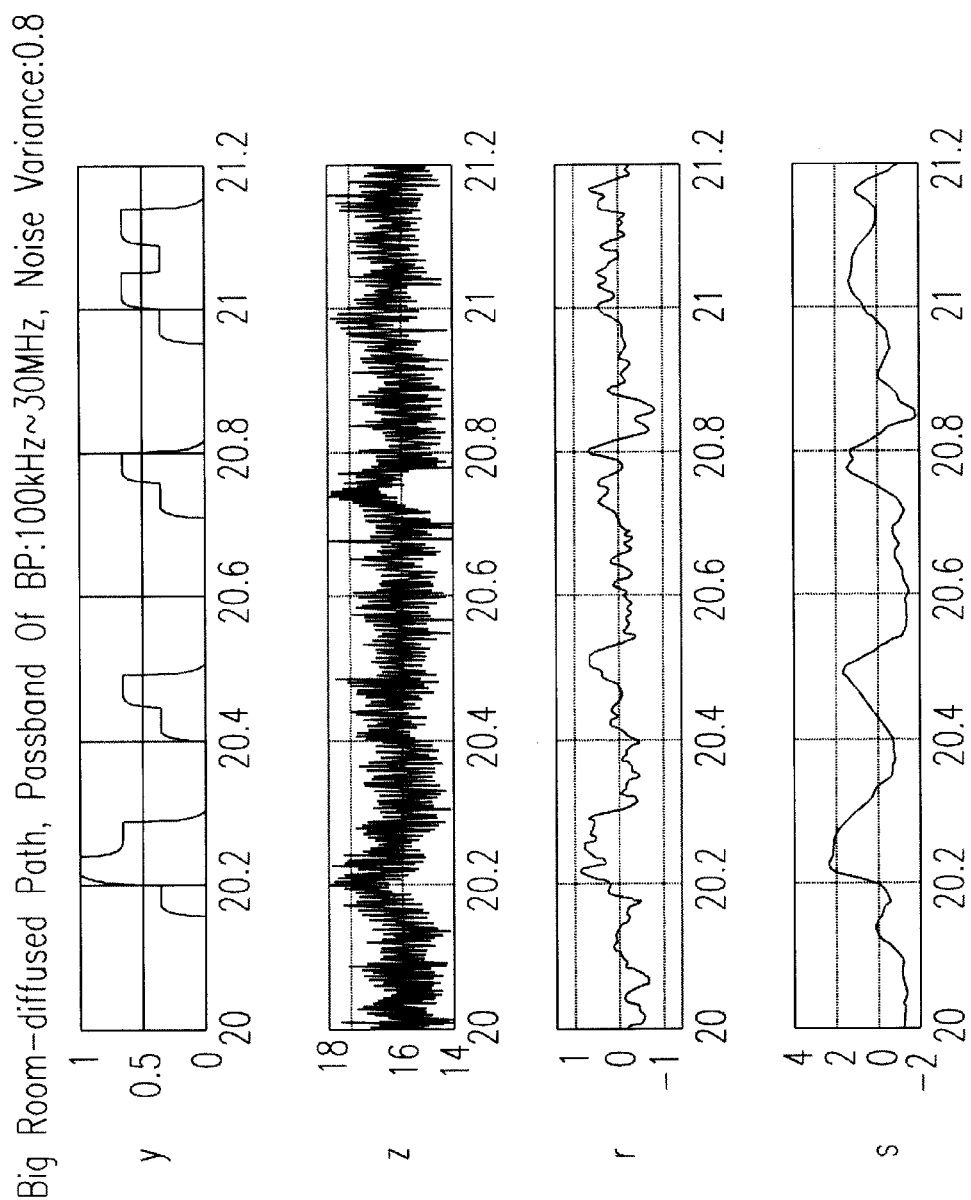

For Test 1~Test 4, it can be found we can demodulate easily so that we choose the worse Test 2 for display. As to Tests 5~8, we select representative Tests 7 and 8 for display. FIGS. 13~15 respectively show the simulation results thereof, in which the first row shows how the multipath channel influences PPM signal, the second row shows the result after the noise is introduced where the PPM signal exists over the large direct current and the low frequency alternate current, the third row shows the result after bandpass filtered, and the fourth row shows the correct position of the peak by the naked eye. By the MATLab simulation software, one can detect the peak by Equation (1) and demodulate the source signal by Equation (2).

As shown in FIG. 13, for a small room environment, we can demodulate without any difficulty and recognize the peak position by the naked eye. As shown in FIGS. 14 & 15, for a large room environment, we can recognize the correct peak position although the noise is larger. The MATLab software can be used to demodulate by Equations (1) and (2). As shown in FIG. 15, it is a very bad environment (in the second row) and we cannot easily recognize the signal slot even after bandpass filtered (in the third row). With the matching filter, the overall signal-to-noise can be enhanced (by 6 dB) in order to facilitate the demodulation. The feasibility of the present invention is accordingly illustrated.

From the above-described, we can know advantages of the present invention. Firstly, its timing recovery circuit is not used to control the sampling timing but is only used for data demodulation, in order to avoid the difficulties of high speed timing recovery and to enhance the transmission efficiency. Secondly, it allows demodulation by the software after the signal is received, which in turn permits an earlier demodulation of different transmission formats and enables to cope with a unique transmission environment with a powerful software demodulating capability in order to widen the application range. As shown in FIG. 3, the present invention does not have an overall feedback loop and thus is very suitable to be used in the pipelined circuit structure in the VLSI to increase the speed and lower the power consumption. As evidenced in the simulation, with a simple matching filter, the SNR is enhanced so that the present invention can still be applied to a worse channel environment.

The present invention also proposes an ODPPM technique to reduce the intersymbol interference and enhance the transmission speed and performance by optimizing among channel environment, transmitting energy and the receiving resolution. The ODPPM can use the peak address to modulate and demodulate through Equations (3) and (4). Further, the possibility of a post-software demodulation can cope with the diversified indoor infrared environments.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. An architecture of a non-synchronous open loop demodulation circuit in a pulse position modulation for retrieving a data from a received source signal comprising:
    a transformation circuit operating said source signal to produce a quantized data having a plurality of data slots;
    a slot address detector electrically connected to said transformation circuit for reaching a peak address from addresses of said data slots; and
    a timing recovery decoder electrically connected to said slot address detector for recovering said data through decoding said peak address, wherein said timing recovery decoder includes a preamble detector detecting a preamble sequence of said source signal through a series of said peak addresses to generate a starting signal.

2. An architecture according to claim 1 wherein said transformation circuit includes:

a signal receiving module receiving and amplifying said source signal to generate a first signal;

a filter electrically connected to said signal receiving module for filtering a high frequency noise and a low frequency noise out of said first signal to generate a second signal; and an analog-to-digital converter electrically connected to said filter for quantizing said second signal to generate said quantized data to be outputted to said slot address detector.

3. An architecture according to claim 2 wherein said filter is a bandpass filter.

4. An architecture according to claim 1 wherein said source signal is a pulse position modulation signal.

5. An architecture according to claim 1 wherein said slot address detector includes:

a matching filter for comparing therewith said quantized data to obtain a compared result;

a peak detector electrically connected to said matching filter for finding a peak from said compared result to generate a pulse signal synchronous with said peak; and a peak address counter electrically connected to said peak detector for counting said pulse signal in order to determine said peak address whenever said pulse signal appears a pulse, to be outputted to said timing recovery decoder.

6. An architecture according to claim 5 wherein said matching filter includes:

a shifting register for registering said quantitzed data; and a summation circuit electrically connected to said shift register for summing what is stored in said register to generate said compared result to be outputted to said peak detector.

7. An architecture according to claim 5 wherein said peak corresponds to a specific slot address of said source signal and is detected when a value of said compared result is larger than adjacent values of said compared result.

8. An architecture according to claim 1 wherein said timing recovery decoder further includes:

a symbol timing recovery circuit electrically connected to said preamble detector and actuated by said starting signal to detect a symbol start address of said source signal from said series of peak addresses; and a demodulator electrically connected to said timing recovery circuit for demodulating from said series of peak addresses and said symbol start address said data to be outputted.

9. An architecture according to claim 1 wherein said preamble detector is a confidence counter.

10. An architecture according to claim 8 wherein said symbol timing recovery circuit includes:

a register registering said symbol start address and an accumulated error between a respective said peak address and said symbol start address; and an adder electrically connected to said register for adding a phase error between said respective peak address and said symbol start address to said symbol start address and said accumulated error.

11. An architecture according to claim 10 wherein a bit distance between said symbol start address and said phase error is set to determine a loop bandwidth of said symbol timing recovery circuit.

12. An architecture according to claim 8 wherein said demodulator includes:

a subtractor for subtracting a respective said peak address by said symbol start address;

an adder electrically connected to said subtractor for adding a constant to a difference between said respective peak address and said symbol start address; and a missing symbol detector electrically connected to said adder for comparing said respective peak address and a preceding peak address to check whether there is a missing symbol.

13. An architecture according to claim 8 wherein said demodulator is a software for demodulating a respective said peak address stored in a memory unit.

14. An architecture according to claim 1 wherein said source signal is an infrared signal through an offset differential pulse position modulation.

15. An architecture according to claim 14 wherein said offset differential pulse position modulation is modulated by an operation equation of $Ti=D+di*R+S$ where Ti is symbol period, D is offset, di is the data, R is the unit waiting time and S is required infrared transmitting time.

16. An architecture according to claim 14 wherein said offset differential pulse position modulation is demodulated by an operation equation of $di=(Ti-D-S) \div R$ where Ti is symbol period, D is offset, di is the data, R is the unit waiting time and S is required infrared transmitting time.

17. An architecture according to claim 16 wherein said offset differential pulse position modulation records first a detected peak address and then demodulated by a software.

18. An architecture of a non-synchronous open loop demodulation circuit in a pulse position modulation for retrieving a data from a received source signal wherein said source signal is an infrared signal through an offset differential pulse position modulation, said architecture comprising:

a transforming circuit operating said source signal to produce a quantized data having a plurality of data slots;

a slot address detector electrically connected to said transformation circuit for reaching a peak address from addresses of said data slots; and a timing recovery decoder electrically connected to said slot address detector for recovering said data through decoding said peak address.

* * * * *